United States Patent [19]

Kaplan et al.

[11] 4,017,719

[45] Apr. 12, 1977

[54] BINARY RATE MULTIPLIER WITH MEANS FOR SPACING OUTPUT SIGNALS

[75] Inventors: Gerald Stanley Kaplan, Lawrenceville; Andrew David Ritzie, Delran, both of N.J.

[73] Assignee: RCA Corporation, New York, N.Y.

[22] Filed: Dec. 18, 1975

[21] Appl. No.: 642,111

[52] U.S. Cl. .............................. 235/150.3; 328/15; 328/38; 328/41

[51] Int. Cl.² ........................ G06F 7/39; H03K 5/00

[58] Field of Search ............ 235/150.3; 307/220 R, 307/225 R; 328/15, 34, 38, 41

[56] References Cited

UNITED STATES PATENTS

| | | | |
|---|---|---|---|
| 3,673,391 | 6/1972 | Lougheed ........................ | 235/150.3 |
| 3,739,156 | 6/1973 | Gebelein et al. ............... | 235/150.3 |
| 3,753,125 | 8/1973 | Ishikawa et al. ..................... | 328/38 |
| 3,832,640 | 8/1974 | Cederquist et al. ............. | 328/34 X |
| 3,835,396 | 9/1974 | Demos et al. ................... | 328/15 X |
| 3,935,538 | 1/1976 | Kizler et al. .......................... | 328/38 |

Primary Examiner—Jerry Smith
Attorney, Agent, or Firm—Carl M. Wright; H. Christoffersen; S. Cohen

[57] ABSTRACT

Circuit and method for spacing the output signals from a binary rate multiplier by adjusting the rate of the internal clock of the binary rate multiplier to a value approximating (N+1) times $f_0$ where N represents the multiplier of the input frequency $f_0$. The output signals thereby produced are substantially evenly spaced at a rate N times $f_0$.

6 Claims, 1 Drawing Figure

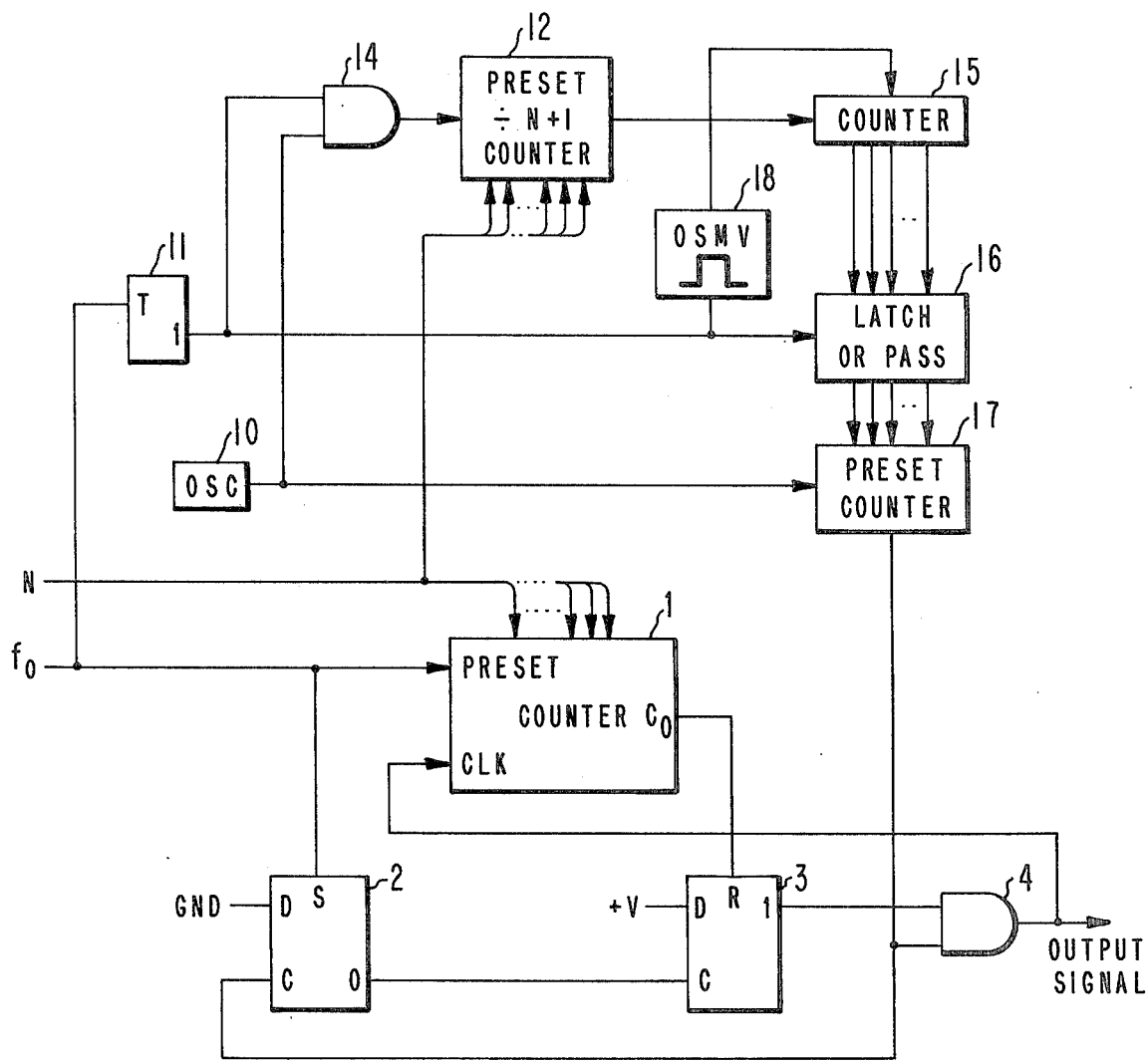

BINARY RATE MULTIPLIER WITH MEANS FOR SPACING OUTPUT SIGNALS

BACKGROUND OF THE INVENTION

A binary rate multiplier is a circuit having as its input signals a multiplier value N and a frequency to be multiplied, $f_0$, which produces output signals at a rate N times $f_0$. There are two basic types of binary rate multipliers. The first type includes an m-stage binary ripple counter (or divider) used with a $2^m$ times $f_0$ system clock. The set output signal from each of the m counter stages primes a separate AND gate, each of which is enabled by a corresponding bit from the binary multiplier value, N. The output signals from the AND gates are combined in a single OR gate to produce the output signals at a frequency of N times $f_0$. The output signals from this type of binary rate multiplier are unevenly spaced throughout a period of the input signal $f_0$. An example of this type of binary rate multiplier is explained in greater detail in *Electronic Design* 11, May 23, 1968, pp. 78 et seq.

A second type of binary rate multiplier utilizes a presettable counter which is incremented by the circuit output signals. A non-zero value in the presettable counter primes an AND gate which is enabled by a clocking signal which has a rate greater than the maximum desired value of N times $f_0$. When N output signals at the internal clock rate have been produced, the output gate is disabled until the next period of $f_0$ which presets the counter, usually to the value of the complement of N and the process continues. The output signals in this second type of binary rate multipliers are produced at the internal clock rate and are groups at the beginning of each output period.

The present invention is used with a binary rate multiplier of the second type to space the ouput signals substantially evenly throughout the period represented by the reciprocal of $f_0$.

SUMMARY OF THE INVENTION

A binary rate multiplier for producing N times $f_0$ output signals stores the value of N in a counter and accepts input signals at a rate $f_0$. The counter counts the output signals from an AND gate driven by a clock source having a rate of $f_c$ which is not less than the maximum of N times $f_0$. A clock adjustment circuit responsive to the values of N and $f_0$ adjusts the clock rate to approximately (N+1) times $f_0$.

BRIEF DESCRIPTION OF THE DRAWING

The sole FIGURE of the drawing is a logic diagram illustrating a preferred embodiment of the invention.

DETAILED DESCRIPTION OF THE PREFERRED EMBODIMENT

In the FIGURE, an oscillator 10 produces clocking pulses at a frequency $f_c$ which is not less than the maximum desired rate of output signals. The input signals at a rate $f_0$ to be multiplied by a value N is applied as the preset signal to a presettable divide-by-N counter 1 and to a triggerable flip-flop 11. The value of N, the multiplier for the input signal at rate $f_0$, is coupled as the input signal to the presettable counter 1 and a presettable divide-by-(N+1) counter 12.

A presettable divide-by-N counter is basically a counter comprising a specific number of counter stages having provision for setting associated stages with the complement of the bits of the N input signal. When a count input signal is provided, N signals will be counted to cause the counter to produce a carry output signal from the most significant stage. A commercially available integrated circuit for dividing by N is a type MC10136 (Motorola Corp.). The divide-by-N or presettable counters can be preset by an external signal such as the counter 1 or can be selfpresetting such as the counter 12. For an example of selfpresetting counters and divide-by-(N+1) counters, see *Electronic Design* 7, Apr. 1, 1973, pp. 42 and 43.

The oscillator 10 also primes an AND gate 14 which is enabled by the triggerable flip-flop 11 during alternate periods of the input frequency to be multiplied, $f_0$. As a result, during one period of the input frequency to be multiplied, the clocking signals from the oscillator 10 trigger the counter 12 to produce an output signal for every (N+1)-th clocking signal. Each output signal from the counter 12 increments the value in a counter 15. The contents of the counter 15 are latched or passed by a special latch device 16 when the flip-flop 11 is set or reset, respectively. The output signals from the special latch 16 are used to preset a counter 17 which is incremented by the clocking signals from the oscillator 10. The carry output signal from the counter 17 provides a clocking signal for the binary rate multiplier as described below.

In the binary rate multiplier, a presettable counter 1 is coupled to count the output signals from an AND gate 4. The output signals from the counter 17 prime the AND gate 4 which is enabled by the set output signal from a D-type flip-flop 3. The output signals from the counter 17 also provide a clock signal to a D-type flip-flop 2 so that each such clock signal applies a reset to the flip-flop 2, which is set by each input signal of the frequency to be divided, $f_0$. The reset output signal from the flip-flop 2 provides a clock pulse to the flip-flop 3. The resulting sequence of operations is that the first clock pulse which resets the flip-flop 2 after it has been set produces a signal which sets the flip-flop 3, which in turn enables the AND gate 4. When the counter 1 has counted N output pulses, the flip-flop 3 is reset, inhibiting the AND gate 4. The output signals from the AND gate 4 have an average frequency of N times $f_0$. If the frequency of the clock signals applied to the AND gate 4 is much greater than $f_0$, output signals are groups of high frequency pulses occurring at the beginning of period of the input frequency, $f_0$.

The clock signal from the counter 17 is adjusted to a rate of approximately (N+1) times $f_0$ so that the output signals are substantially evenly spaced throughout each period of $f_0$.

The output signals from the AND gate 14 comprise $f_c/f_0$ pulses during each period $1/f_0$, since the output signal from the triggerable flip-flop is equal to the period of $f_0$, i.e., $1/f_0$. The signals at the output of the AND gate 14 are the logical product of the input signals, i.e., $f_c$ times $1/f_0$, or $f_c/f_0$. The output signals from the counter 12 represent the output signal frequency from the AND gate 14 divided by the value (N+1). The output signal from the counter 12 is, therefore, represented by $f_c/((N+1)f_0)$, which is accumulated by the counter 15 during one period of the input signal $f_0$.

When the flip-flop 11 is reset, the output signals from the special latch 16 are the output signals from the counter 15. When the flip-flop 11 is triggered to the set state, a one-shot multivibrator 18 provides a short pulse to reset the counter 15, the contents of which were latched by the special latch 16.

The special latch 16 can be implemented using a standard latch circuit, such as a commercially available integrated circuit type SN74100 (8-bits) or SN7475 (4-bits) (Texas Instruments, Inc.), with the output terminals therefrom multiplexed with the inputs so that when the latch clock is low, the input signals appear at the multiplexor output terminals and when the latch clock is high, the input signals are stored in the latch flip-flops whose output signals appear at the multiplexor output terminals. A suitable multiplexor is an integrated circuit type SN74157 (Texas Instruments, Inc.), which can be used by grounding the strobe line (pin 15) and coupling the set output signal from the flip-flop 11 to the select line (pin 1).

The counter 17 divides the clock signals from the oscillator 10 by the value $f_c/((N+1)f_0)$. Since $f_c$ is the output frequency from the oscillator 10, the output signal frequency from the counter 17 is $(N+1)$ times $f_0$.

The clocking signal at the input to the terminal of the AND gate 4 must be at least N times $f_0$. By reducing the clock signal to a value of $(N+1)$ times $f_0$, the spacing of the output pulses is made substantially even throughout each period of the input signal $f_0$ without causing an error by missing an output pulse which can occur if the clock is reduced to N times $f_0$.

The special latch 16 can be replaced by a standard latch circuit, e.g., an SN74100 et al. identified above. The set output signal from the flip-flop 11 will latch the contents from the counter 15 every other cycle of the input signal, $f_0$, and provide an input signal to the presettable counter 17 that is constant over two consecutive periods of the input signal, $f_0$.

Various modifications to the systems and circuits described and illustrated to explain the concepts and modes of practicing the invention might be made by those or ordinary skill in the art within the principles or scope of the invention as expressed in the appended claims.

What is claimed is:

1. In a binary rate multiplier for producing N times $f_0$ output signals, of the type having first input means for receiving signals representing the value of N, second input means for receiving signals at a rate $f_0$, programmable divide-by-N means preset to said value of N from said first input means by said second input signal means and responsive to said output signals for producing a carry signal after N output signals have been counted, clocking means for producing clocking signals at a rate $f_c$ not less than $N_{MAX}$ times $f_0$, where $N_{MAX}$ is the maximum value of N, and gating means responsive to said carry signal for passing N clocking signals for each signal from said second input means, the improvement comprising:

clock adjustment means responsive to the N value and to the rate $f_0$ for adjusting the clock signal rate to approximately $(N+1)$ times $f_0$.

2. The invention as claimed in claim 1 wherein said clock adjustment means includes first divider means responsive to said first and second input means and said clocking means for producing an output signal at a rate represented by $f_c$ divided by $(N+1)$ times $f_0$; and second divider means responsive to said clocking means and the output signal from said first divider means for producing an output signal at a rate represented by $(N+1)$ times $f_0$.

3. The invention as claimed in claim 2 wherein said first divider means includes a divide-by-$(N+1)$ means responsive to said clocking means and said first and second input means for counting clock signals during a single period of said second input signal $f_0$.

4. The invention as claimed in claim 3 wherein said second divider means comprises first counter means for counting the output signals from said divide-by-$(N+1)$ means during one period of said second input signal $f_0$; and second counter means responsive to a count value in said first counter and to said clocking means for producing an output signal at each K-th pulse clocking signal, where K is the value stored in said first counter.

5. A method for producing substantially evenly spaced output signals from a binary rate multiplier comprising the steps of:

producing maximum desired rate clock pulses;

storing a value N representing the frequency multiplier;

adjusting the rate of said clock pulses to a value approximating $(N+1)$ times $f_0$, the rate of the signals to be multiplied; and controlling an output signal gating means with the adjusted clock pulses;

enabling the output gating means for N output pulses for each signal to be multiplied.

6. The invention as claimed in claim 5 wherein the steps of adjusting the rate of said clock pulses includes the steps of:

dividing the maximum rate of clock pulses by the rate of the signal to be multiplied to produce a first quotient;

dividing the first quotient by a value of $(N+1)$ to produce a second quotient; and dividing the maximum rate of clock pulses by the second quotient.

* * * * *